(12) United States Patent
Kang et al.

(10) Patent No.: US 8,504,358 B2
(45) Date of Patent: Aug. 6, 2013

(54) VOICE RECORDING EQUIPMENT AND METHOD

(75) Inventors: Hong Kang, Shanghai (CN); Guo-Zhi Ding, Shanghai (CN); Chi-Ming Lu, Taipei Hsien (TW)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 342 days.

(21) Appl. No.: 12/913,780

(22) Filed: Oct. 28, 2010

(65) Prior Publication Data

US 2012/0041760 A1    Feb. 16, 2012

(30) Foreign Application Priority Data

Aug. 13, 2010    (CN) .......................... 2010 1 0253228

(51) Int. Cl.
*G10L 11/06* (2006.01)
*G10L 21/02* (2013.01)
*H04R 29/00* (2006.01)

(52) U.S. Cl.
USPC .............................. 704/215; 704/226; 381/56

(58) Field of Classification Search
None
See application file for complete search history.

(56) References Cited

U.S. PATENT DOCUMENTS

| | | | | |
|---|---|---|---|---|
| 3,832,491 A * | 8/1974 | Sciulli et al. | | 704/212 |
| 4,028,496 A * | 6/1977 | LaMarche et al. | | 704/233 |
| 4,052,568 A * | 10/1977 | Jankowski | | 704/233 |
| 4,449,190 A * | 5/1984 | Flanagan et al. | | 706/22 |
| 4,829,578 A * | 5/1989 | Roberts | | 704/233 |
| 5,459,814 A * | 10/1995 | Gupta et al. | | 704/233 |
| 5,659,622 A * | 8/1997 | Ashley | | 381/94.1 |
| 6,031,915 A * | 2/2000 | Okano et al. | | 381/56 |
| 6,374,213 B2 * | 4/2002 | Imai et al. | | 704/233 |
| 6,381,570 B2 * | 4/2002 | Li et al. | | 704/233 |
| 6,910,005 B2 * | 6/2005 | Bartosik | | 704/201 |
| 7,167,544 B1 * | 1/2007 | Bauer | | 379/88.01 |
| 7,620,544 B2 * | 11/2009 | Woo | | 704/226 |
| 7,705,646 B2 * | 4/2010 | Matsui | | 327/165 |
| 7,949,523 B2 * | 5/2011 | Imoto | | 704/228 |
| 2004/0162722 A1 * | 8/2004 | Rex et al. | | 704/211 |
| 2009/0299741 A1 * | 12/2009 | Chittar et al. | | 704/233 |
| 2011/0246189 A1 * | 10/2011 | Fox et al. | | 704/210 |

* cited by examiner

*Primary Examiner* — Brian Albertalli
(74) *Attorney, Agent, or Firm* — Altis Law Group, Inc.

(57) ABSTRACT

In a voice recording equipment and method, voice data from a speaker is received using a microphone. Threshold values T1 and T2 of surrounding environment of the voice recording equipment are determined. If an intensity of the voice data is less than or equal to the threshold value T2, the voice recording is stopped and the speaker is informed that the voice data is not useful. If the intensity of the voice data is greater than the threshold values, the voice data is stored into a storage unit.

14 Claims, 5 Drawing Sheets

VOICE RECORDING EQUIPMENT AND METHOD

BACKGROUND

1. Technical Field

Embodiments of the present disclosure generally relate to recording technology, and more particularly to a voice recording equipment and method.

2. Description of Related Art

When using voice recording equipment, if the surrounding environment of the voice recording equipment is silent, high definition audio can be created, even when the speaker is speaking in a low voice. However, if the surrounding environment of the voice recording equipment is noisy, the speaker must speak loudly when creating high definition audio. Therefore, the speaker needs to regulate his/her voice level according to the surrounding environment of the voice recording equipment during the voice recording session.

However, during the voice recording session, the speaker may not realize that they need to raise his/her voice level when they are in a noisy environment.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may be comprised of connected logic units, such as gates and flip-flops, and may be comprised of programmable units, such as programmable gate arrays or processors. The modules described herein may be implemented as either software and/or hardware modules and may be stored in any type of computer-readable medium or other computer storage device.

Figure 1:
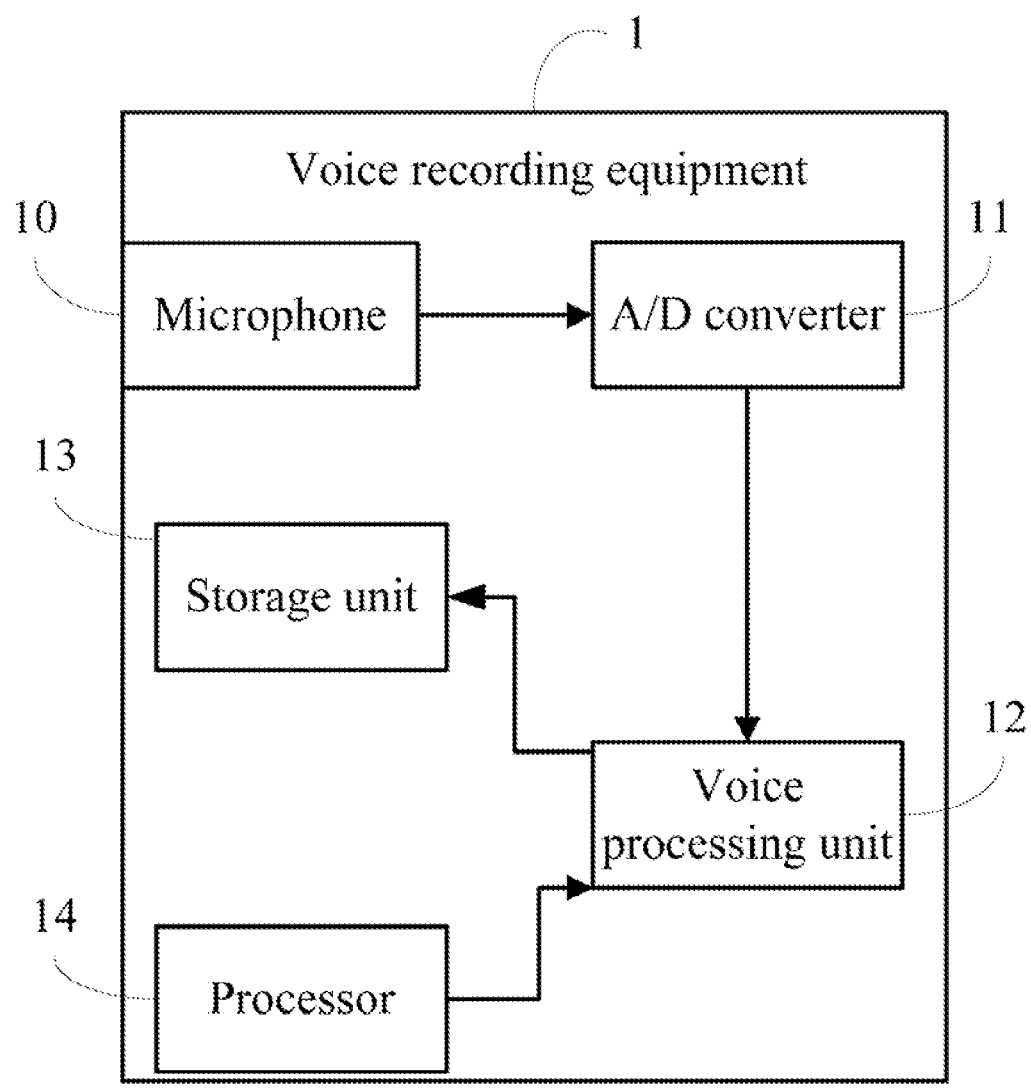
FIG. 1 is a block diagram of a voice recording equipment, according to some embodiments of the present disclosure.

FIG. 1 is a block diagram of a voice recording equipment 1, according to some embodiments of the present disclosure. The voice recording equipment 1 includes a microphone 10, an analog/digital (A/D) converter 11, a voice processing unit 12, a storage unit 13, and a processor 14. These components 10~14 communicate over one or more communication buses or signal lines. The voice recording equipment 1 can be any electronic device, including but not limited to a computer, a TV set, a mobile phone, a digital camera, for example. It should be appreciated that the voice recording equipment 1 may have more or fewer components than shown in FIG. 1, or a different configuration of components. The various components shown in FIG. 1 may be implemented in hardware, software or a combination thereof, including one or more signal processing and/or application specific integrated circuits.

The microphone 10 receives voice data. In some embodiments, a speaker speaks into the microphone 10 to make a recording for the voice data. The voice data from the microphone 10 is digitized by the A/D converter 11, and is transmitted to the voice processing unit 12.

The voice processing unit 12 includes a plurality of function modules (see below descriptions referring to FIG. 2), to determine threshold values T1 and T2 of the surrounding environment of the voice recording equipment 1, and prompt the speaker if the intensity of the voice data is less than the threshold value T2.

The function modules of the voice processing unit 12 may comprise one or more computerized codes in the form of one or more programs that are stored in the storage unit 13. The storage unit 13 may include high speed random access memory and may also include non-volatile memory, such as one or more magnetic disk storage devices, flash memory devices, or other non-volatile solid state memory devices. The one or more computerized codes of the voice processing unit 12 include instructions that are executed by the processor 14, to provide functions for the function modules of the voice processing unit 12.

Figure 2:
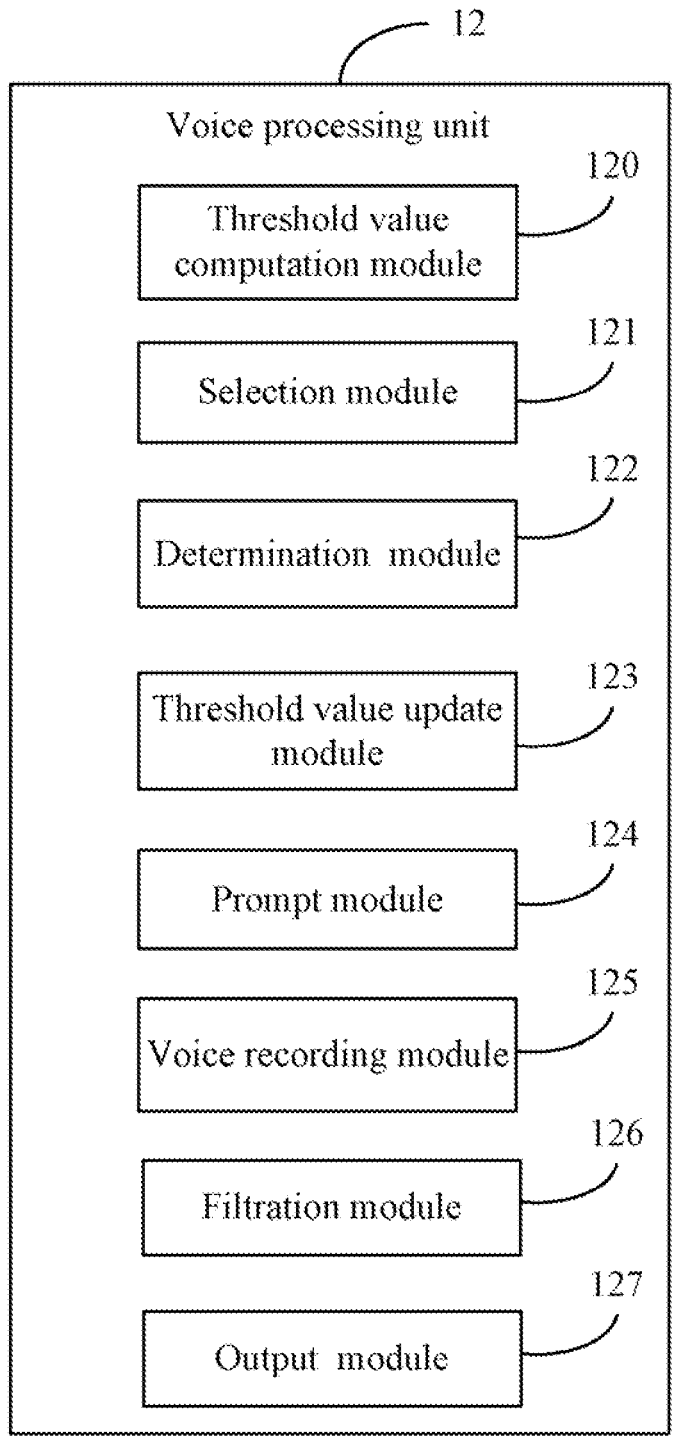
FIG. 2 is a block diagram illustrating function modules of a voice processing unit included in the voice recording equipment of FIG. 1, according to some embodiments of the present disclosure.

FIG. 2 is a block diagram illustrating function modules of the voice processing unit 12, according to some embodiments of the present disclosure. The function modules of the voice processing unit 12 may include a threshold value computation module 120, a selection module 121, a determination module 122, a threshold value update module 123, a prompt module 124, and a voice recording module 125.

The threshold value computation module 120 computes a sound intensity P1 of an initial surrounding environment of the voice recording equipment 1, and repeatedly computes a sound intensity P2 of a current surrounding environment of the voice recording equipment 1 after a predetermined time interval (S seconds) to obtain n sound intensity P2, where n is a positive integer. It may be appreciated that, the sound intensity is defined as the sound power per unit area. In some embodiments, the predetermined time interval is 0.167 seconds, and n=30. The threshold value computation module 120 further computes threshold values T1 and T2 of the initial surrounding environment of the voice recording equipment 1 according to the sound intensity P1. In some embodiments, T1=P1+δ_speak and T2=P1+δ_silence, where δ_speak is the maximum intensity of the speaker's voice and δ_silence is the minimum intensity of the speaker's voice. In addition, the threshold value computation module 120 computes a value of |P2−T1|.

The selection module 121 selects one or more sound intensities P2 which enable the value of |P2−T1| greater than a predetermined value. In some embodiments, the predetermined value is 6. The selection module 121 further computes a count of the one or more sound intensities P2.

The determination module 122 compares if the count is greater than or equal to a value of n/2, and determines if the current surrounding environment of the voice recording equipment 1 is different from the initial surrounding environment of the voice recording equipment 1 according to the comparison. As mentioned above, the n is a positive integer, for example 30. In some embodiments, the current surrounding environment of the voice recording equipment 1 is different from the initial surrounding environment of the voice recording equipment 1 if count>=n/2, and the current surrounding environment of the voice recording equipment 1 is the same as the initial surrounding environment of the voice recording equipment 1 if count<n/2.

The threshold value update module 123 updates the threshold values T1 and T2 if the current surrounding environment of the voice recording equipment 1 is different from the initial surrounding environment of the voice recording equipment 1, according to the count of the one or more sound intensities P2 and a sum of the one or more sound intensities P2. In some embodiments, after updating, T1=P3+δ_speak and T2=P3+δ_silence, where P3=sum/count.

The prompt module 124 stops recording the voice data and informs the speaker that the voice data is not useful, if the intensity of the voice data is less than or equal to the threshold value T2.

The voice recording module 125 stores the voice data into the storage unit 13 if the intensity of the voice data is greater than the threshold value T2.

In some embodiments, the voice processing unit 12 further includes a filtration module 126 that deletes the voice data from the storage unit 13 if the file size of the voice data is greater than a predetermined file size. The predetermined file size may be 80 KB, for example.

In some embodiments, the voice processing unit 12 further includes an output module 127 that outputs the voice data stored in the storage unit 13 after finishing the recording.

Figure 3:
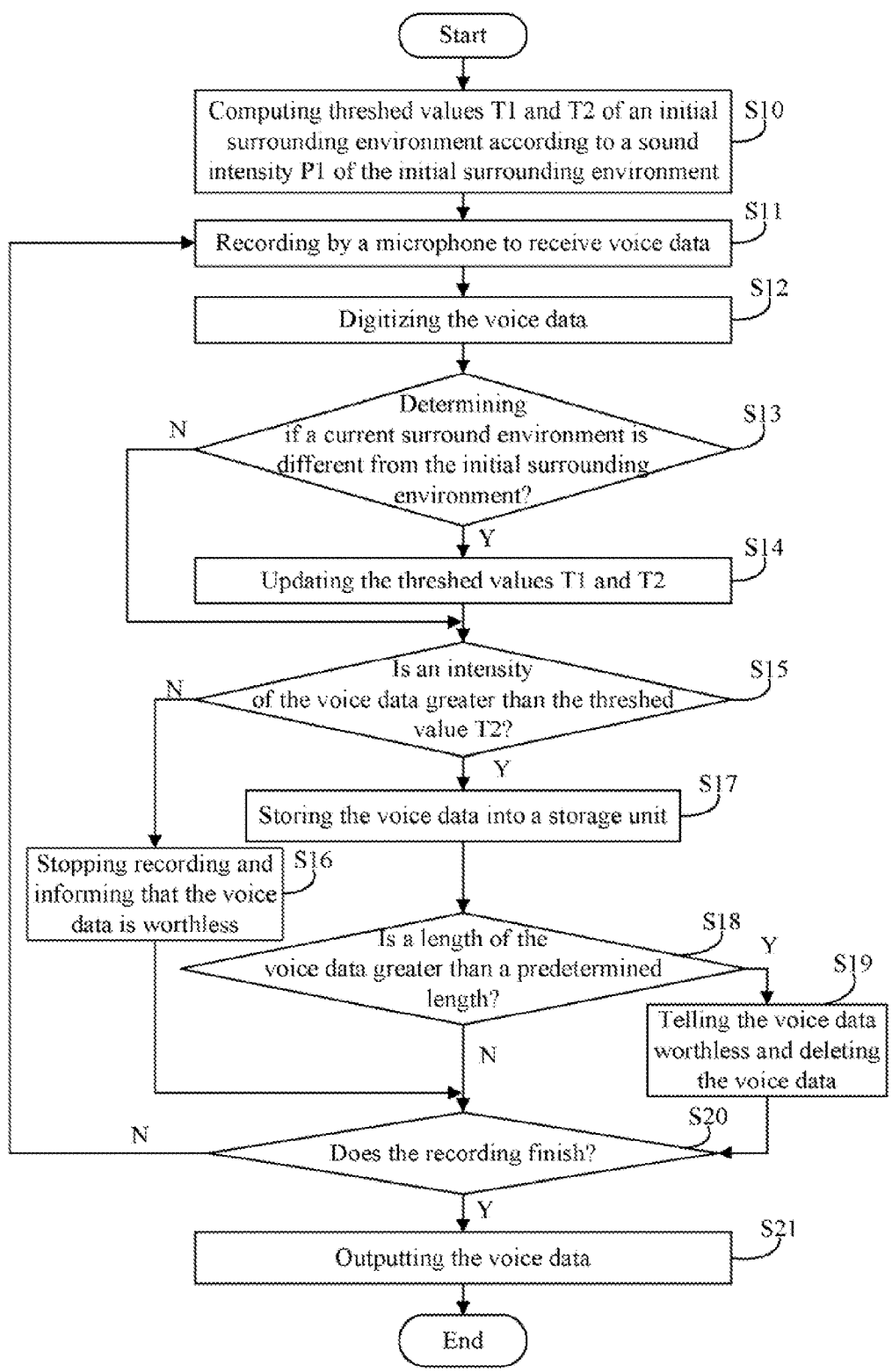
FIG. 3 is a flowchart of a voice recording method, according to some embodiments of the present disclosure.

FIG. 3 is a flowchart of a voice recording method, according to some embodiments of the present disclosure. The method is performed by execution of computer readable program code by the processor 14 of the voice recording equipment 1. Depending on the embodiments, additional blocks in the flow of FIG. 3 may be added, others removed, and the ordering of the blocks may be changed.

In block S10, the threshold value computation module 120 computes threshold values T1 and T2 of an initial surrounding environment of the voice recording equipment 1 according to a sound intensity P1 of the initial surrounding environment of the voice recording equipment 1. In some embodiments, T1=P1+δ_speak and T2=P1+δ_silence, where δ_speak is the maximum intensity of the speaker's voice and δ_silence is the minimum intensity of the speaker's voice.

In block S11, the microphone 10 begins to make a recording to receive voice data from a speaker, and in block S12, the A/D converter 11 digitizes the voice data.

In block S13, the threshold value update module 123 determines if a current surrounding environment of the voice recording equipment 1 is different from the initial surrounding environment of the voice recording equipment 1. Block S14 is implemented if the current surrounding environment of the voice recording equipment 1 is different from the initial surrounding environment of the voice recording equipment 1. Block S15 is implemented if the current surrounding environment of the voice recording equipment 1 is the same as the initial surrounding environment of the voice recording equipment 1. Detailed descriptions of block S13 see below referring to FIG. 4.

In block 514, the threshold value update module 123 updates the threshold values T1 and T2. Detailed descriptions of block S14 are shown below with reference to FIG. 5.

In block S15, the prompt module 124 determines if an intensity of the voice data is greater than the threshold value T2. Block S16 is implemented if the intensity of the voice data is less than or equal to the threshold value T2. Otherwise, block S17 is implemented if the intensity of the voice data is greater than the threshold value T2.

In block S16, the prompt module 124 stops recording the voice data and informs the speaker that the voice data is not useful. In block S17, the voice recording module 125 stores the voice data into the storage unit 13.

In block S18, the filtration module 126 determines if a file size of the voice data is greater than a predetermined file size. The predetermined file size may be 80 KB, for example. Block S19 is implemented if the file size of the voice data is greater than the predetermined file size. Otherwise, block S20 is implemented if file size of the voice data is less than or equal to the predetermined file size.

In block S19, the filtration module 126 deletes the voice data from the storage unit 13. In block S20, the output module 127 determines if the recording is finished. Block S11 is repeated if the recording is not finished. Otherwise, block S21 is implemented if the recording is finished. In block S21, the output module 127 outputs the voice data stored in the storage unit 13 after finishing the recording.

Figure 4:
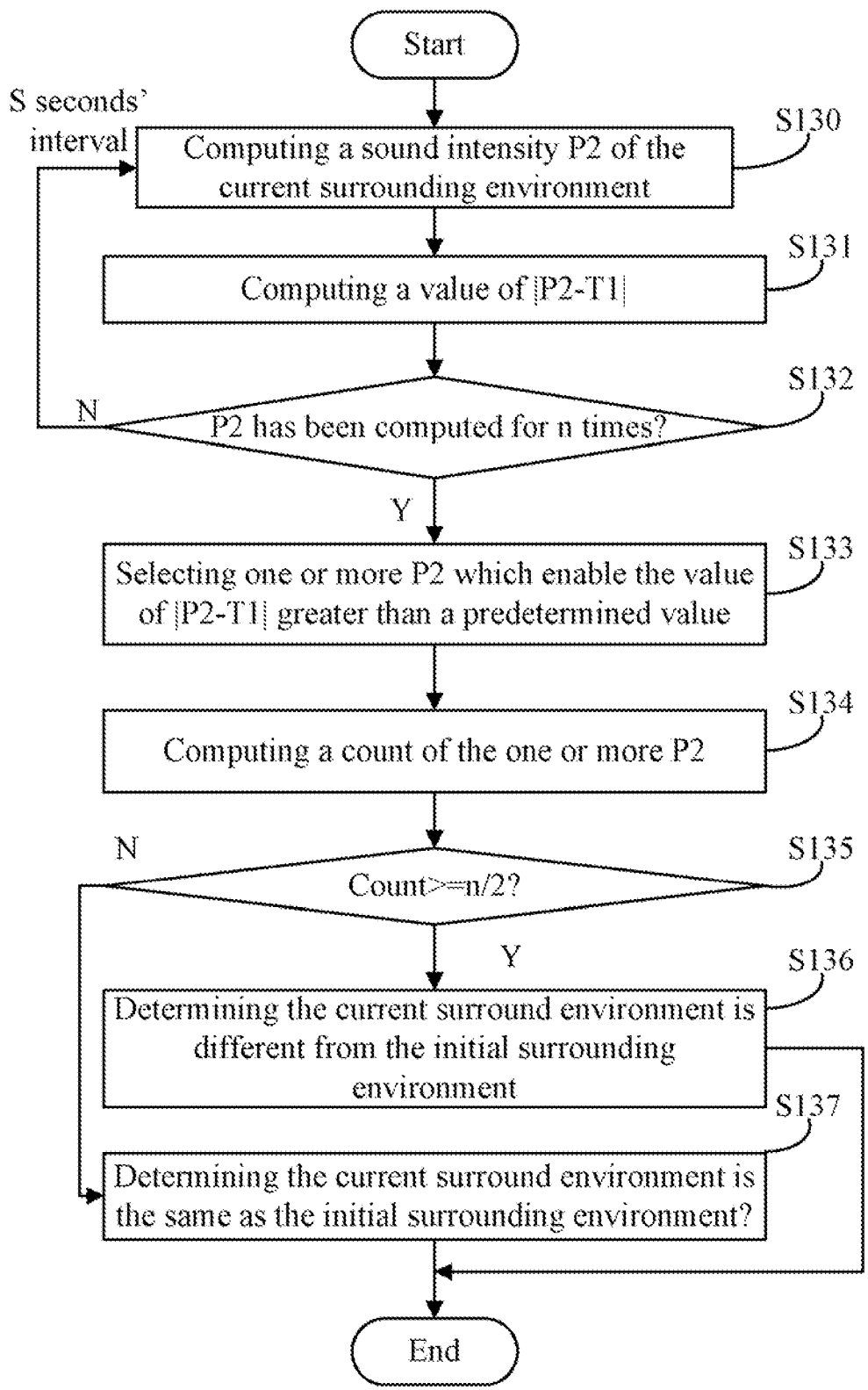
FIG. 4 is a flowchart detailing block S13 of FIG. 3, according to some embodiments of the present disclosure.

FIG. 4 is a flowchart detailing block S13 of FIG. 3, according to some embodiments of the present disclosure. Depending on the embodiments, additional blocks in the flow of FIG. 4 may be added, others removed, and the ordering of the blocks may be changed.

In block S130, the threshold value computation module 120 computes a sound intensity P2 of the current surrounding environment of the voice recording equipment 1, and in block S131, the threshold value computation module 120 computes a value of |P2−T1|.

In block S132, the threshold value computation module 120 determines if P2 has been computed for n times, where n is a positive integer. In some embodiments, n=30. Blocks S130 to S131 are repeated after a predetermined time interval (S seconds) if P2 has not been computed for n times. In some embodiments, the predetermined time interval is 0.167 seconds, and n=30. Block S133 is implemented if P2 has been computed for n times.

In block S133, the selection module 121 selects one or more sound intensities P2 which enable the value of |P2−T1| greater than a predetermined value. In some embodiments, the predetermined value is b 6. In block S134, the selection module 121 computes a count of the one or more sound intensity P2.

In block S135, the determination module 122 compares that if the count>=n/2. Block S136 is implemented if the count>=n/2, or block S137 is implemented if the count<n/2. As mentioned above, the n is a positive integer, for example 30.

In block S136, the determination module 122 determines that the current surrounding environment of the voice recording equipment 1 is different from the initial surrounding environment of the voice recording equipment 1. In block S137, the determination module 122 determines that the current surrounding environment of the voice recording equipment 1 is the same as the initial surrounding environment of the voice recording equipment 1.

Figure 5:
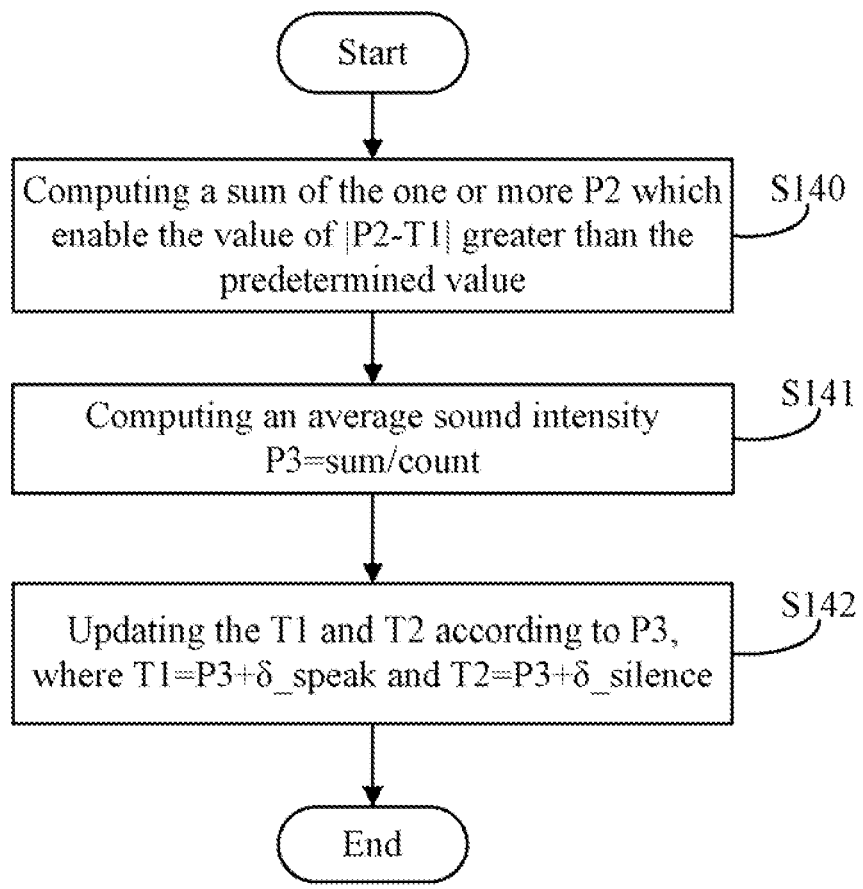
FIG. 5 is a flowchart detailing block S14 of FIG. 3, according to some embodiments of the present disclosure.

FIG. 5 is a flowchart detailing block S14 of FIG. 3, according to some embodiments of the present disclosure. Depending on the embodiments, additional blocks in the flow of FIG. 5 may be added, others removed, and the ordering of the blocks may be changed.

In block S140, the threshold value update module 123 computes a sum of the one or more P2 which enable the value of |P2−T1| greater than the predetermined value. In block S141, the threshold value update module 123 computes an average sound intensity P3=sum/count. In block S142, the threshold value update module 123 updates the T1 and T2 according to P3. After updating, T1=P3+δ_speak and T2=P3+δ_silence.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A voice recording method of a voice recording equipment, comprising:
    (a) computing threshold values T1 and T2 of an initial surrounding environment of the voice recording equipment, wherein T1=P1+δ_speak, T2=P1+δ_silence, δ_speak is a maximum intensity of voice data of a speaker, δ_silence is a minimum intensity of the voice data of the speaker, and P1 is a sound intensity of the initial surrounding environment;
    (b) receiving the voice data from the speaker using a microphone of the voice recording equipment to make a recording;
    (c) determining if a current surrounding environment of the voice recording equipment is different from the initial surrounding environment of the voice recording equipment by:
        (c1) computing a sound intensity P2 of the current surrounding environment of the voice recording equipment, and computing a value of |P2−T1|;
        (c2) repeating (c1) after a predetermined time interval for n times, wherein n is a positive integer;
        (c3) selecting one or more sound intensities P2 which enable the value of |P2−T1| to be greater than a predetermined value;
        (c4) computing a count of the one or more selected sound intensities P2;
        (c5) determining that the current surrounding environment of the voice recording equipment is different from the initial surrounding environment of the voice recording equipment upon the condition that count>=n/2; or
        (c6) determining that the current surrounding environment of the voice recording equipment is the same as the initial surrounding environment of the voice recording equipment upon the condition that count<n/2;
    (d') updating the threshold values T1 and T2 upon the condition that the current surrounding environment of the voice recording equipment is different from the initial surrounding environment of the voice recording equipment; and
    (d) stopping recording of the voice data and informing the speaker that the voice data is not useful upon the condition that an intensity of the voice data is less than or equal to the threshold value T2; or
    (e) storing the voice data into a storage unit upon the condition that the intensity of the voice data is greater than the threshold value T2.

2. The method as described in claim 1, before (c) further comprising:
    digitizing the voice data.

3. The method as described in claim 1, after (e), further comprising:
    outputting the voice data stored in the storage unit after finishing the recording.

4. The method as described in claim 1, after (e), further comprising:
    deleting the voice data from the storage unit upon the condition that a file size of the voice data is greater than a predetermined file size.

5. The method as described in claim 1, wherein the step of updating the threshold values T1 and T2 in step (d') comprises:
    computing a sum of the one or more selected sound intensities P2;
    computing an average sound intensity P3=sum/count; and
    updating that T1=P3+δ_speak and T2=P3+δ_silence.

6. A non-transitory storage medium having stored thereon instructions that, when executed by a processor, cause the processor to perform a voice recording method of a voice recording equipment, wherein the method comprises:
    (a) computing threshold values T1 and T2 of an initial surrounding environment of the voice recording equipment, wherein T1=P1+δ_speak, T2=P1+δ_silence, δ_speak is a maximum intensity of voice data of a speaker, δsilence is a minimum intensity of the voice data of the speaker, and P1 is a sound intensity of the initial surrounding environment;
    (b) receiving the voice data from the speaker using a microphone of the voice recording equipment to make a recording;
    (c) determining if a current surrounding environment of the voice recording equipment is different from the initial surrounding environment of the voice recording equipment by:
        (c1) computing a sound intensity P2 of the current surrounding environment of the voice recording equipment, and computing a value of |P2−T1|;
        (c2) repeating (c1) after a predetermined time interval for n times, wherein n is a positive integer;
        (c3) selecting one or more sound intensities P2 which enable the value of |P2−T1| to be greater than a predetermined value;
        (c4) computing a count of the one or more selected sound intensities P2;
        (c5) determining that the current surrounding environment of the voice recording equipment is different from the initial surrounding environment of the voice recording equipment upon the condition that count>=n/2; or
        (c6) determining that the current surrounding environment of the voice recording equipment is the same as the initial surrounding environment of the voice recording equipment upon the condition that count<n/2;
    (d') updating the threshold values T1 and T2 upon the condition that the current surrounding environment of the voice recording equipment is different from the initial surrounding environment of the voice recording equipment; and
    (d) stopping recording of the voice data and informing the speaker that the voice data is not useful upon the condition that an intensity of the voice data is less than or equal to the threshold value T2; or
    (e) storing the voice data into a storage unit upon the condition that the intensity of the voice data is greater than the threshold value T2.

7. The non-transitory storage medium as described in claim 6, before (c) the method further comprising:
    digitizing the voice data.

8. The non-transitory storage medium as described in claim 6, after (e), the method further comprising:
    outputting the voice data stored in the storage unit after finishing the recording.

9. The non-transitory storage medium as described in claim 6, after (e), the method further comprising:
deleting the voice data from the storage unit upon the condition that a file size of the voice data is greater than a predetermined file size.

10. The non-transitory storage medium as described in claim 6, wherein the step of updating the threshold values T1 and T2 in step (d') comprises:
computing a sum of the one or more selected sound intensities P2;
computing an average sound intensity P3=sum/count; and
updating that T1=P3+δ_speak and T2=P3+δ_silence.

11. A voice recording equipment, comprising:
a microphone that is used for receiving voice data from a speaker to make a recording;
a storage unit;
at least one processor; and
a voice processing unit comprising one or more programs that are stored in the storage unit and are executed by the at least one processor, operable to:
determine threshold values T1 and T2 of an initial surrounding environment of the voice recording equipment, wherein T1=P1+δ_speak, T2=P1+δ_silence, δ_speak is a maximum intensity of voice data of a speaker, δ_silence is a minimum intensity of the voice data of the speaker, and P1 is a sound intensity of the initial surrounding environment;
update the threshold values T1 and T2 upon the condition that a current surrounding environment of the voice recording equipment is different from the initial surrounding environment of the voice recording equipment, wherein whether the current surrounding environment is different from the initial surrounding environment is determined according to a sound intensity P2 of the current surrounding environment and the threshold value T1; and
prompt the speaker upon the condition that an intensity of the voice data of the speaker is less than the threshold value T2;
wherein the one or more programs of the voice processing unit comprise:
a threshold value computation module to compute a sound intensity P1 of the initial surrounding environment of the voice recording equipment, repeatedly compute the sound intensity P2 of the current surrounding environment of the voice recording equipment after a predetermined time interval for n times to obtain n sound intensities P2, wherein n is a positive integer, compute the threshold values T1 and T2 according to the sound intensity P1, and compute a value of |P2−T1|;
a selection module to select one or more sound intensities P2 which enable the value of |P2−T1| to be greater than a predetermined value, and compute a count of the one or more selected sound intensity P2;
a determination module to compare if count>=n/2, and determine if the current surrounding environment of the voice recording equipment is different from the initial surrounding environment of the voice recording equipment according to the comparison;
a threshold value update module to update the threshold values T1 and T2 upon the condition that the current surrounding environment of the voice recording equipment is different from the initial surrounding environment of the voice recording equipment, according to the count of the one or more selected sound intensity P2 and a sum of the one or more selected sound intensity P2;
a prompt module to stop recording of the voice data and inform the speaker that the voice data is not useful upon the condition that an intensity of the voice data is less than or equal to the threshold value T2; and
a voice recording module to store the voice data into the storage unit upon the condition that the intensity of the voice data is greater than the threshold value T2.

12. The voice recording equipment as described in claim 11, wherein the current surrounding environment of the voice recording equipment is different from the initial surrounding environment of the voice recording equipment upon the condition that count>=n/2, and the current surrounding environment of the voice recording equipment is the same as the initial surrounding environment of the voice recording equipment if count<n/2.

13. The voice recording equipment as described in claim 11, wherein the voice processing unit further comprises:
an output module to output the voice data stored in the storage unit after finishing the recording.

14. The voice recording equipment as described in claim 11, wherein the voice processing unit further comprises:
a filtration module to delete the voice data from the storage unit upon the condition that a file size of the voice data is greater than a predetermined file size.

* * * * *